June 20, 1939.  S. L. CLOTHIER ET AL  2,163,539

MOTION PICTURE FILM SCANNING

Filed March 15, 1938

Stewart L. Clothier
Harold C. Hogencamp
INVENTORS

Patented June 20, 1939

2,163,539

UNITED STATES PATENT OFFICE 2,163,539

MOTION PICTURE FILM SCANNING

Stewart L. Clothier, Irvington, and Harold C. Hogencamp, Maplewood, N. J., assignors to Kolorama Laboratories, Inc., Newark, N. J., a corporation of New Jersey Application March 15, 1938, Serial No. 195,938

10 Claims. (Cl. 178—6.7)

This invention relates to television and more particularly to methods and apparatus for scanning motion picture film.

It is customary when scanning motion picture film to illuminate a narrow transverse portion of the film, representing for example an elemental scanning line, and to progressively illuminate successive portions of the film by continuously moving the film longitudinally with respect to the illuminated zone. In order to obtain sharp definition of the illuminated portion, the light is ordinarily concentrated upon a narrow transverse zone of the film, and the size of the illuminated area is further restricted by the use of a slotted aperture plate positioned closely adjacent to the film. The slot in the aperture plate is ordinarily relatively narrow, the slot itself being dimensioned to correspond substantially with an elemental scanning line. As the width of the slot is ordinarily minute, and the plate itself is positioned as close as is conveniently possible to the film, it is not unusual that particles of dust and other foreign matter accumulate within the slot, which action is encouraged by the proximity of the plate to the moving film. Whenever any portions of the slot are thus obscured, the illumination of the film ceases to be uniform, and the scanning operation is correspondingly impaired. Some relief from this condition might be effected by separating the aperture plate somewhat from the film, in which event the collection of dust and other foreign particles would be minimized, but it is necessary to maintain the aperture plate as close as possible to the film, as separation therefrom lessens the sharpness of the illuminated area defined by the slot, rendering the outline hazy and indistinct.

Accordingly the principal objects of the present invention are to provide improved methods and apparatus for defining the narrow transverse area of the film which is illuminated; to provide improved means and methods for recording television signals on sensitized film; to provide an aperture plate which is so positioned with respect to the remainder of the apparatus that the accumulation of dust particles and other foreign matter within the aperture is minimized; to provide means for positioning the aperture plate so that it is readily accessible as for adjustment or replacement; to provide means whereby the scanning drum may be positioned relatively remote from the film; and to provide means whereby a single aperture plate may define an elemental scanning line irrespective of the size of the film employed. These and other objects of the invention will become more readily apparent from the following description in conjunction with the appended drawing.

The invention comprises generally forming an image of the illuminated transverse portion of the motion picture film in space and disposing the slotted aperture plate substantially in the plane of the image. The aperture plate may be so constructed that the slot is adjustable for individual needs. Since the image of the illuminated portion is located at a considerable distance from the film, the aperture plate is positioned so that the accumulation of dust and other foreign particles, deposited largely as a result of the film motion, is reduced to a minimum. The improved arrangement is equally adaptable to receivers and transmitters.

Figure 1:
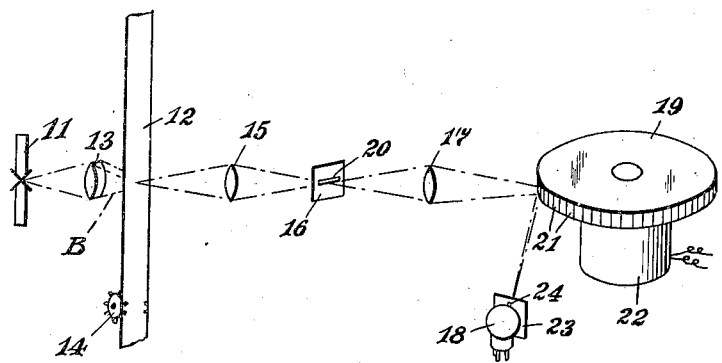
Fig. 1 is a schematic view illustrating one method of practicing the present invention.

Referring again to the drawing, and more especially to Fig. 1, the improved scanning apparatus comprises a light source 11 such as an electric arc or incandescent filament capable of producing high intensity illumination. Light from the source is concentrated in a beam B upon a transverse area or zone across a standard motion picture film 12, for example, by means of a cylindrical lens 13 interposed between the light source and the film. The film is continuously moved in a longitudinal direction as by sprockets 14 so that successive portions of the film are progressively illuminated as they pass the beam B, focussed upon the film by the lens 13. The portion of the film illuminated comprises a relatively narrow transverse area which preferably is narrower than the width of a single frame of the film. A lens 15 is disposed adjacent to the illuminated area on the side of the film opposite the light source so as to form an image of the successively illuminated portions in space. The aperture plate or mask 16 may be of any convenient design and preferably comprises a slotted plate which is disposed substantially in the plane of the image with the slot 20 extending transversely with respect to the film. A second lens 17 is positioned on the opposite side of the plate 16 so as to project the portion of the image visible through the slot as a second image adjacent to a photocell 18. The beam B is preferably reflected from a scanning drum 19 which is positioned so as to intercept the beam. The drum 19 is provided about its periphery with a plurality of scanning elements such as reflecting surfaces 21, the drum being rotated by means of a synchronous motor 22.

It is frequently desirable that the film, or an image thereof, be located relatively close to the scanning drum 19 for optimum operating efficiency. By locating the film at a position remote from the drum, as herein disclosed, and forming an image of the film at an intermediate point, i. e., adjacent the plate 16, standard projection equipment may be used. If the film 12 were located adjacent to the plane of the plate 16, the projection mechanism and other parts associated therewith, ordinarily extending forwardly of the film in a standard motion picture projector, would interfere with the operation of the drum 19.

The axis of the motor 22 is arranged vertically so that the face of the drum 19 is in a plane parallel to the slot 20. The lens 17 is adjusted so as to form the second image, preferably immediately in front of the photocell 18. A photocell aperture plate 23 provided with a narrow slot 24 is disposed in the plane of the second image with the slot 24 positioned at right angles to the slot 20.

The slot 20 in the aperture plate 16 preferably corresponds dimensionally with an elemental scanning line. Accordingly as the film moves continuously, for example in a downward direction, successive transverse portions of the film are focussed in the plane of the plate 16, and the film is successively analyzed as a succession of transverse lines which are scanned at a synchronous rate by the rotating drum 19 which operates to sweep the series of line images longitudinally. The linear images are formed in the plane of the photocell aperture plate 23, and are swept horizontally past the slot 24 to successively energize the photocell 18. Any suitable conventional means such as a thermionic amplifier (not shown) may be employed to amplify the photocell impulses for transmission to the receiving station.

Figure 2:
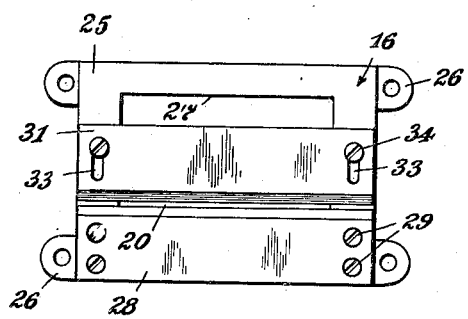
Fig. 2 is a detail elevational view of one form of slotted aperture plate for use in the scanning apparatus.

One form of adjustable slotted aperture plate which may be employed with the present invention is illustrated in Fig. 2. This plate consists of a suitable frame 25 comprising for example an open rectangle fitted with suitable mounting lugs 26. The opening 27 within the frame 25 is partly covered by a lower plate 28 rigidly secured to the frame 25 as by means of screws 29. An upper plate 31 is adjustably mounted upon the frame 25 in spaced relation to the plate 28 so that a narrow slot 20 is formed between the respective plates. The plates are adjustably mounted with respect to one another for example by forming elongated openings 33 at the opposite sides of the plate 31 and securing the plate to the frame as by means of machine screws 34. The plates are preferably bevelled along the adjoining edges, and the entire structure blackened to minimize reflection of light. The plates may be adjusted for given operating conditions by interposing a lamina or sheet of known thickness between the bevelled edges of the plates 31 and 28, and moving the plate 31 into engagement therewith, after which the screws 34 may be tightened.

It will be understood that with an aperture plate 16 having a slot 20 of fixed dimensions, the proportionate size of the opening with respect to the film may be varied by altering the size of the first image. In this manner the same plate may be used for different sizes of film without change in the relative aperture size, simply by maintaining a first image of constant size.

Flexibility of the apparatus may further be extended by employing a slotted aperture plate of the type shown in Fig. 2, in which case any desired size of opening may be obtained irrespective of the size of the image.

Figure 3:
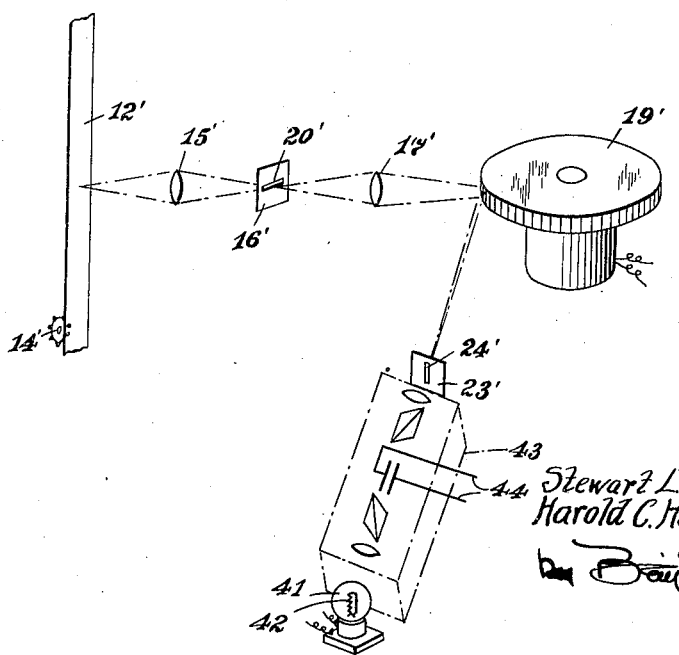
Fig. 3 is a schematic view of a modified scanning apparatus.

By rearranging the apparatus and modifying it somewhat, the scanning mechanism may be employed for recording television signals permanently upon a sensitized film. The arrangement comprises essentially eliminating the light source 11 and the lens 13, and replacing the photocell 18 by a source of properly modulated light. As indicated in Fig. 3, the rearranged combination comprises a light source 41, for example an electric light bulb having an elongated filament 42 capable of emitting high intensity illumination. Light from the source is passed through a conventional light-modulating unit 43 which operates to vary the intensity of the light beam in accordance with the television impulses, received from a television transmitter, for example, over wires 44. The beam emerges as a concentrated spot focussed upon an aperture plate 23' provided with a slot 24', with the elongated image of the filament 42 extending preferably along the slot.

An image of the brightly illuminated spot is formed in space by a lens 17', and is swept successively in a linear path by means of the scanning drum 19'. The configuration of the linear path is defined by a slotted aperture plate 16' interposed substantially in the plane of the image so that the image of the modulated spot is swept successively along the slot 20' to form an elemental scanning line. Since the spot is elongated by virtue of the shape of the filament 42 and the dimensions of the slot 24', and since the images extend transversely of the slot 20', undesirable motion of the spot in a direction transversely of the slot 20' does not appreciably affect the formation of the scanning line.

An image of the scanning line is projected upon successive transverse portions of a sensitized film 12' by means of a lens 15'. The film preferably comprises ordinary light-sensitive motion-picture film which is progressed continuously past the image of the scanning line, as by means of rotatable sprockets 14', so as to record upon the film a continuous record of the television signals. Either aperture plate 23' or 16' may be of the same adjustable nature as that shown in Fig. 2. By the present arrangement, neither aperture plate is positioned closely adjacent to moving parts, so that dust collection within the slot is minimized.

The invention may be modified somewhat without departing from the scope of the invention or sacrificing its advantages.

We claim:

1. A method of recording television signals upon a sensitized film, comprising concentrating light from a source into an illuminated spot; modulating said spot in accordance with the television signals; forming an image of said spot in space; sweeping the image of said modulated spot successively in a linear path substantially in the plane of said image; defining the configuration of said path as an elemental scanning line; and projecting an image of said scanning line progressively upon successive portions of a sensitized film.

2. Method as claimed in claim 1 wherein said spot is formed in an elongated form and the image thereof is swept in said linear path with the spot extending transversely of the path of movement.

3. Apparatus for recording television signals upon a sensitized film, comprising a light source; means for concentrating said light as an illuminated spot; means for modulating said spot in accordance with the television signals; means for forming an image of said spot in space; means for sweeping the image of said spot in a linear path substantially in the plane of said image; a slotted aperture plate positioned substantially in the plane of said image with the slot extending in the direction of said path so as to define a scanning line; and means for projecting an image of said scanning line progressively upon successive portions of a sensitized film.

4. Apparatus as claimed in claim 3 wherein a mirror drum is used to sweep the image of said spot in a linear path.

5. Apparatus for scanning motion picture film comprising means for progressively illuminating successive transverse portions of a film; means for forming an image of said transverse portions in space; a slotted aperture plate disposed substantially in the plane of said image; and scanning means for scanning the portion of said image visible through said slot.

6. Apparatus as claimed in claim 5 wherein said aperture plate is disposed with said slot extending transversely with respect to said film.

7. Apparatus as claimed in claim 5 wherein the slot of said aperture plate is of adjustable width to correspond dimensionally with the size of an elemental line of said image.

8. Apparatus for scanning motion picture film comprising a light source; means for concentrating light from said source upon a transverse area of said film; means for continuously moving said film longitudinally; a first lens for forming a first image of the illuminated transverse area in space on the side of the film opposite said light source; a slotted aperture plate substantially in the plane of said image with the slot thereof extending transversely with respect to said film; a photocell; a second lens for forming a second image in the region of said photocell of the portion of said first image visible through said aperture plate; and a scanning drum interposed between said first image and said photocell.

9. Apparatus as claimed in claim 8 including a second slotted aperture plate disposed adjacent to said photocell substantially in the plane of said second image with the slot thereof disposed at right angles to the slot in said first mentioned plate.

10. Apparatus as claimed in claim 8 wherein said scanning drum comprises a plurality of plane reflecting surfaces about its periphery.

STEWART L. CLOTHIER.
HAROLD C. HOGENCAMP.